INVENTOR
J. W. GEWARTOWSKI
BY
Sylvan Sherman
ATTORNEY

July 4, 1967 J. W. GEWARTOWSKI 3,329,884

FREQUENCY MULTIPLIER UTILIZING A HYBRID JUNCTION
TO PROVIDE ISOLATION BETWEEN THE
INPUT AND OUTPUT TERMINALS

Filed June 8, 1964 3 Sheets-Sheet 2

FREQUENCY MULTIPLIER UTILIZING A HYBRID JUNCTION TO PROVIDE ISOLATION BETWEEN THE INPUT AND OUTPUT TERMINALS

Filed June 8, 1964 3 Sheets-Sheet 3

United States Patent Office 3,329,884 Patented July 4, 1967

3,329,884

FREQUENCY MULTIPLIER UTILIZING A HYBRID JUNCTION TO PROVIDE ISOLATION BETWEEN THE INPUT AND OUTPUT TERMINALS

James W. Gewartowski, Chatham, N.J., assignor to Bell Telephone Laboratories, Incorporated, New York, N.Y., a corporation of New York Filed June 8, 1964, Ser. No. 373,325
7 Claims. (Cl. 321—60)

This invention relates to electromagnetic wave devices and, in particular, to a frequency multiplier whose input impedance is independent of its output load impedance.

There are many uses in an electromagnetic transmission system for a simple, frequency mutliplier. For example, frequency multipliers are being used more often in local oscillators in radio relay systems and in military radar systems. However, they are prone to instabilities and are difficult to tune unless some form of isolation is provided between multiplying stages. Typically, isolation is provided by means of an isolator or a circulator. However, such devices are not readily available at all frequencies and, if available, are expensive or bulky.

It is, therefore, an object of this invention to provide a frequency multiplier which inherently includes isolation between its output and its input terminals.

More specifically, it is an object of this invention to provide a frequency multiplier whose input impedance is independent of its load impedance.

In accordance with the invention, isolation between the input and the output of a frequency multiplier is achieved by means of a 90 degree hybrid junction to which there are connected a pair of identical two-port networks containing nonlinear elements. More specifically, one end of each of the two networks is connected to one pair of conjugate branches of the hybrid junction. The other ends of the two networks are connected together by means of a circuit having a prescribed phase shift of $2n \times 90°$, where $n$ is an integer, and $2n$ is the frequency mutliplication factor of the stage. The output load is connected at the junction of the phase shifter and either of the networks.

A signal source supplying energy of the frequency to be multiplied is connected to one branch of the other pair of conjugate branches of the hybrid, while the second branch of this second pair of branches is match-terminated.

This arrangement provides an improved method of accomplishing the objects of this invention at frequencies where circulators or isolators are available, since these expensive items may now be eliminated. At lower frequencies, where isolators and circulators are not available, the invention provides the only known means of accomplishing these objectives.

These and other objects and advantages, the nature of the present invention, and its various features, will appear more fully upon consideration of the various illustrative embodiments now to be described in detail in connection with the accompanying drawings, in which.

Figure 1:
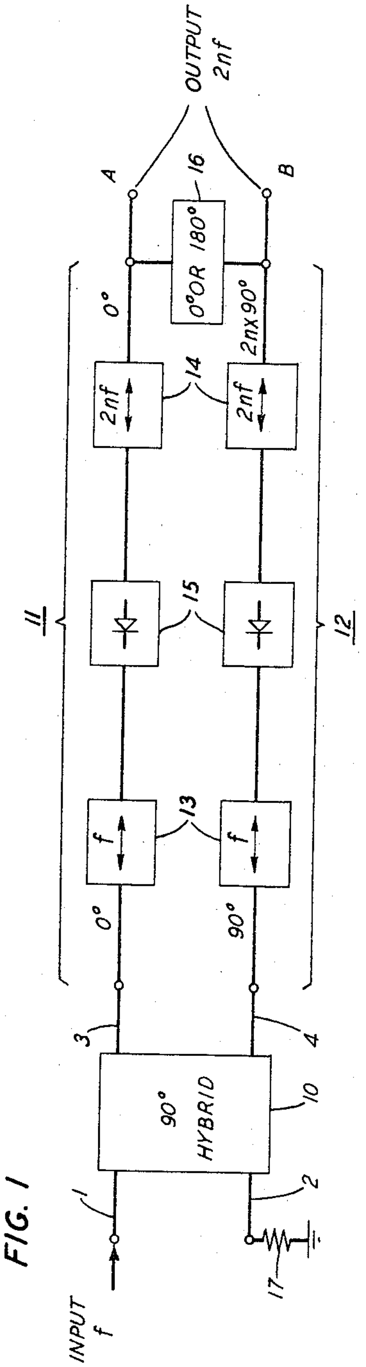
FIG. 1 shows in block diagram a frequency multiplier in accordance with the invention.

Referring to FIG. 1, there is illustrated in block diagram a frequency multiplier in accordance with the invention capable of providing even harmonics of an applied signal. The multiplier comprises a 90 degree hybrid junction 10 having two pairs of conjugate branches 1–2 and 3–4, and suitably connected nonlinear elements.

The term "hybrid junction" is used here in its accepted sense to describe a power-dividing network having four branches arranged in pairs, with the branches comprising each pair being conjugate to each other and in coupling relationship to the branches of the other of said pairs. More particularly, in a hybrid, the power applied to one branch of one pair of branches of the power-dividing network, divides equally in the other pair of branches. In addition, in the 90 degree hybrid, there is a 90 degree phase relationship bewteen the divided wave components. Included among such devices are a large variety of directional couplers such as the Riblet coupler (H. J. Riblet, "The Short-Slot Hybrid Junction," Proceedings of the Institute of Radio Engineers, vol. 40, No. 2, February 1952, pages 180 to 184), the multihole 3 db directional coupler (S. E. Miller, "Coupled Wave Theory and Waveguide Applications," Bell System Technical Journal, vol. 33, May 1954, pages 661 to 719) and the semi-optical directional coupler (E. A. J. Marcatili, "A Circular Electric Hybrid Junction and Some Channel-Dropping Filters," Bell System Technical Journal, vol. 40, January 1961, pages 185 to 196). As will be illustrated hereinbelow, a 180 degree hybrid junction such as the "magic tee" or a hybrid transformer, can be converted to a 90 degree hybrid by the addition of a 90 degree phase shifter to one of the output branches.

Branches 3 and 4 of hybrid 10 are connected to two substantially identical two-port networks 11 and 12, each of which contains suitable filters and nonlinear elements. Typically, each network includes a first filter 13 which passes the input frequency signal $f$ but which rejects the harmonic frequencies, and a second filter 14, located at the output end of the network which passes the desired harmonic frequency but rejects the fundamental frequency and the undesired harmonic frequencies.

In order to maintain the impedance balance necessary to produce the desired isolation between the input and output circuits, the two networks 11 and 12 are made to be as identical as the particular application demands. Thus, the term "substantially identical" as used herein shall be understood to mean as identical as is required under the circumstances.

Located between the filters 13 and 14 in each network is a nonlinear element 15. In FIG. 1 the latter is represented as a simple diode. In particular, varactor diodes are popularly used for such applications. However, it is understood that combinations of diodes can be used as well as other nonlinear means such as, for example, gyromagnetic materials, saturable cores and vacuum tubes. For a detailed discussion of the use of varactor diodes for frequency multiplication, see "Varactor Applications," by P. Penfield, Jr. and R. P. Rafuse published by The Massachusetts Institute of Technology Press. The use of gyromagnetic materials for frequency mutliplication is disclosed in United States Patent 3,054,042 issued to M. T. Weiss, Sept. 11, 1962.

When the desired harmonic corresponds to a harmonic divisible by four, such as the fourth and eighth, the outputs of the two networks are in phase and can be directly combined. However, if the desired harmonic is non-divisible by four, such as the second and sixth, the output from the two networks are 180 degrees out of phase. In this latter situation, it becomes necessary to introduce a 180 degree phase shift in one of the networks before combining the two outputs so that they combine in phase. This is denoted in the drawing by showing the output ends of networks 11 and 12 interconnected by block 16 labeled "0° or 180°." The desired harmonic signal can be taken out at either terminal A or B.

The input signal source (not shown) is connected to branch 1 of hybrid 10 while branch 2 is match-terminated by means of a dissipative load resistor 17.

In operation, a signal at frequency $f$ is applied to branch 1 of hybrid 10. The signal divides equally between branches 3 and 4, producing two signal components 90 degrees out of phase with respect to each other. Each of the signal components passes through a filter 13 to a nonlinear element 15 wherein harmonic frequency current components are generated. However, only the even harmonic component of current to which filter 14 is tuned is permitted to reach the output end of each of the networks 11 and 12. In FIG. 1, this component is designated the $2n^{th}$ component, where $n$ is an integer.

The relative phases of the input frequency current components to networks 11 and 12 are 0 degree and 90 degrees, respectively, as indicated in FIG. 1. The $2n^{th}$ harmonic currents produced by the nonlinear elements have relative phases 0 degree and $2n \times 90$ degrees, respectively. Since $2n$ is always an even number, the harmonic currents are either in phase for $n$ even, or 180 degrees out of phase for $n$ odd. Element 16, therefore, either introduces no phase shift or an additional 180 degree phase shift so that the output harmonic currents from networks 11 and 12 combine in phase in the output circuit.

If the output circuit or load presents a mismatch to the frequency multiplier, the power reflected by this mismatch divides equally between the two networks and presents equal mismatches at branches 3 and 4 of hybrid 10. None of this reflected power reaches the input branch, however, since the reflected power combines in branch 2, where it is dissipated in resistor 17. Thus, the input impedance at branch 1 remains constant, regardless of the load mismatch.

Figure 2:
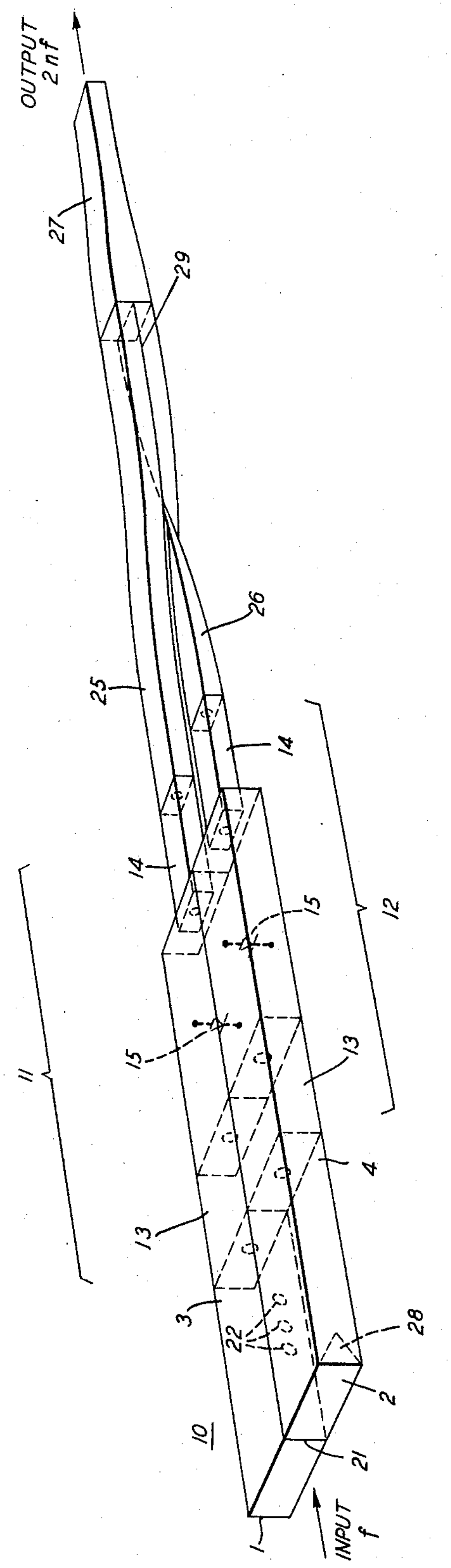
FIG. 2 is an illustrative embodiment of the invention using waveguides as the transmission medium.

FIG. 2 is a specific illustrative embodiment of the invention using conductively bounded rectangular waveguide as the transmission medium. To facilitate the identification of corresponding parts, the same identification numerals as were used in FIG. 1 are used in FIG 2. Referring to FIG. 2, the 90 degree hybrid 10 is a 3 decibel directional coupler comprising a pair of rectangular waveguides of equal cross-sectional dimensions, aligned parallel to each other and sharing a common narrow wall 21. Distributed along wall 21 are the coupling apertures 22. The size and distribution of these apertures are designed in accordance with procedures well known in the art as described, for example, in an article by S. E. Miller and W. W. Mumford published in the September 1952, Proceedings of the Institute of Radio Engineers, vol. 40, at pages 1071–1078.

The signal frequency filters 13 and the harmonic frequency filters 14, comprise conductively bounded cavities each of which is formed by a length of rectangular waveguide bounded by a pair of spaced discontinuities. Filters of this type are described in "Principles and Applications of Waveguide Transmission," by G. C. Southworth at page 286 et seq.

Located between filters 13 and 14 are the non-linear elements 15, which are shown as varactor diodes extending transversely across the waveguides between opposite wide walls. No biasing means are shown. However, it is understood that, if required, the diodes can be biased for more efficient operation. Similarly, additional circuitry necessary for various idler frequencies can be provided, as required for efficient operation.

If the output harmonic currents are in phase (i.e., $n$ is even) the output ends of filters 14 can be directly connected together. If, however, the desired harmonic is such that the harmonic currents are 180 degrees out of phase (i.e., $n$ is odd) a 180 degree phase shift must be provided to establish in-phase conditions. If the wave paths are made of rectangular waveguide, as in FIG. 2, a simple and convenient method of obtaining a 180 degree phase shift is to physically twist the waveguide 180 degrees about its longitudinal axis. This is illustrated in FIG. 2, wherein the output ends of filters 14 are coupled to two rectangular waveguides 25 and 26. The required 180 degree time phase shift is obtained by twisting guide 26 180 degrees about its longitudinal axis, whereas guide 25 is not twisted. These waveguides otherwise have equal electrical lengths.

The output ends of guides 25 and 26 are, in addition, placed one above the other so that they share a common wide wall 29. The harmonic wave energy is coupled out of guides 25 and 26 and into the output waveguide 27 in phase. The latter can be tapered in height and width so as to match the output load impedance.

As in FIG. 1, the input signal is applied to branch 1 of hybrid 10, while branch 2 is match-terminated. In FIG. 2, branch 2 is terminated by means of a dissipative wedge 28.

Figure 3:
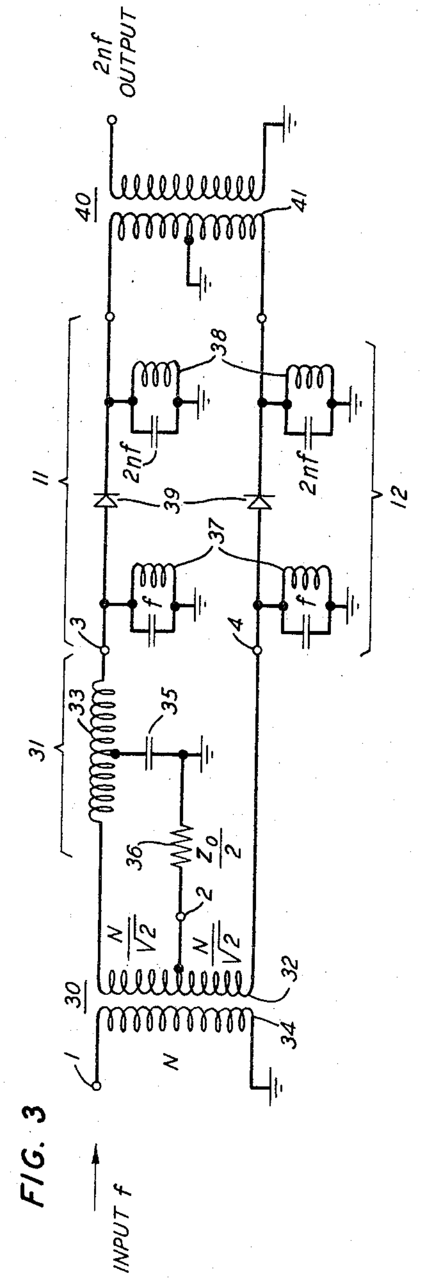
FIG. 3 is an illustrative embodiment of the invention using lumped circuit elements.

FIG. 3 is an illustrative embodiment of the invention at lower frequencies using lumped circuit elements. In this embodiment, the 90 degree hybrid comprises a transformer 30 of turns ratio $N:2N/\sqrt{2}$ and a 90 degree phase shift T section 31 connected to one terminal of the transformer's center-tapped secondary winding 32. This embodiment is an example of how a 180 degree hybrid can be combined with a 90 degree phase shifter to make a 90 degree hybrid.

The T section includes a series inductor 33, one end of which is connected to one terminal of secondary winding 32. A capacitor 35 is connected from the center of inductor 33 to one terminal of primary winding 34 which terminal, in FIG. 3, is at ground potential.

The inductance L of inductor 33 is related to the capacitance C of capacitor 35 by $$L=2/(2\pi f)^2C$$

where $f$ is the input signal frequency. Designating the reactance of capacitor 35 as $$Z_0=1/2\pi fC$$

the reactance of inductor 33 is equal to $2Z_0$.

The center-tap 2 on secondary winding 32 and terminal 1 of the primary winding constitute one pair of conjugate branches of the hybrid junction. The other pair of conjugate branches of the hybrid junction consists of the other end 3 of inductor 33 and the other terminal 4 of the transformer secondary winding 32.

The input signal, at frequency $f$, is applied to hybrid branch 1. Branch 2 is connected to ground through a resistor 36 of resistance $$R=Z_0/2=(2\pi f)L/4$$

As before, two identical networks 11 and 12 are connected to branches 3 and 4 of the hybrid junction. In this embodiment the signal frequency filters are shunt-connected parallel resonant circuits 37 tuned to the input signal frequency $f$. The harmonic frequency filters are also shunt-connected parallel resonant circuits 38 tuned to the harmonic frequency $2nf$.

Connected between the filters 37 and 38 are the series connected diodes 39, constituting the nonlinear elements.

For even values of $n$, the output ends of networks 11 and 12 can be connected directly together, since the harmonic currents are in phase. For odd values of $n$, however, the currents are 180 degrees out of phase and means must be provided for taking this into account when combining the output current from the two networks 11 and 12. In the embodiment of FIG. 3, an output transformer 40, having a grounded center-tap on primary winding 41 is used to combine the harmonic currents in the output circuit. Network 11 is connected to one end of the primary winding 41, and network 12 to the other end. The transformer is thus driven in a push-pull mode.

It is an advantage of the circuit shown in FIG. 3, that an impedance mismatch in the output circuit is reflected equally at hybrid branches 3 and 4. However, as long as the impedances at branches 3 and 4 are equal, the input impedance at branch 1 is $Z_0$ and is independent of the amplitude and phase of the impedance at branches 3 and 4.

Figure 4:
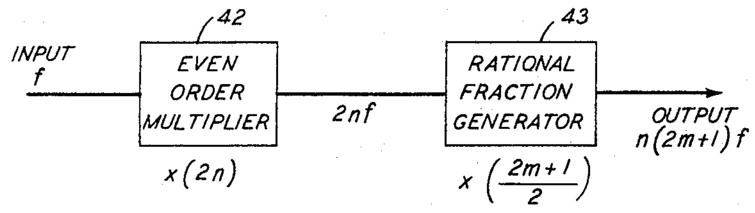
FIG. 4 shows the invention used with a rational fraction generator for generating odd harmonics of the input frequency.

As explained hereinabove, it is necessary to maintain equal impedance across branches 3 and 4 of the hybrid junction in order to maintain the input impedance to the hybrid constant and independent of the mismatch in the output circuit. This limits a multiplier, in accordance with the teachings of the present invention, to even multiples of the input frequency. However, by the addition of a rational fraction generator or a subharmonic generator (of the types described by Penfield and Rafuse in Chapter 9 of their above-cited book) to the output of an even harmonic multiplier, any odd order of frequency multiplication can be obtained while still maintaining the inherent isolation between stages of multiplication. This is illustrated in block diagram in FIG. 4, which shows an even order multiplier 42, followed by a rational fraction generator 43. For an input frequency $f$, an output frequency $n(2m+1)f$ is obtained, where $n$ and $m$ are integers, selected to produce the desired over-all multiplication, which can be either even or odd.

In the particular instance where $n=1$ and $m=0$ (which is the case of a frequency doubler followed by a divide-by-two generator) the output is at the same frequency as the input, and the resulting network is an isolator-type circuit. It has the properties that the signal introduced at the input terminals is transmitted to the ouput terminals with little attenuation, whereas signals introduced at the output terminals are highly attenuated in passing to the input terminals. In addition, the input impedance is constant and matched. However, unlike a true isolator, the output impedance is not necessarily matched.

Figure 5:
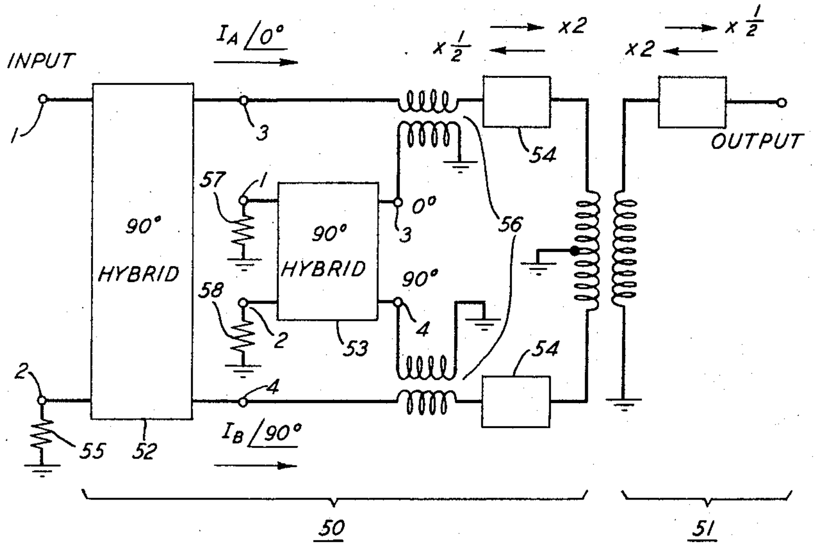
FIG. 5 is an arrangement comprising a double and a divide-by-two stage for producing isolator action without frequency mulitplication.

There is an additional distinction which affects the operation of this type of isolator circuit. A true isolator attenuates signals originating in the output circuit regardless of their source. That is, whether the signal is due to reflections at the output due to mismatch or whether they originate in an independent source in the output circuit, is of no consequence. In the instant isolator, signals due to mismatch are readily attenuated. However, due to the possibility of a 180 degree ambiguity in the output signals produced in a divide-by-two circuit, signals produced by an independent source may be transmitted to the input terminals in the absence of special precautions. FIG. 5 shows an isolator, in accordance with the invention, comprising a doubler stage and a divide-by-two stage. For propagation from input to output, stage 50 is a doubler stage and stage 51 is a divide-by-two stage. For propagation from output to input, stage 51 is the doubler stage and stage 50 is the divide-by-two stage.

A signal applied to the input branch 1 o hybrid 52 produces output currents $I_A \angle 0°$ and $I_B \angle 90°$ in branches 3 and 4. In order for proper operation of the circuit as an isolator, signals originating in the output circuit of stage 51 must appear at branches 3 and 4 with relative phases, 0 degree and 90 degrees, respectively. When they do, they are combined in the hybrid and enter branch 2 where they are dissipated in the terminating resistor 55.

Return signals due to mismatch in the output circuit return with the appropriate phase coherency to insure the proper phase relationship at branches 3 and 4 of hybrid 52. However, signals which originate independently in the output circuit can arrive at branches 3 and 4 with improper phases due to the fact that the output from a divide-by-two generator is equally likely to have one of two phases that differ by 180 degrees. Thus, current $I_B$ may just as likely have a phase angle of −90 degrees instead of +90 degrees relative to current $I_A$. If it is −90°, the currents combine in branch 1 of hybrid 52 instead of branch 2, thus providing no isolation.

To insure the proper phase, a second 90 degree hybrid 53 is added between nonlinear elements 54 and the first hybrid 52. Branches 3 and 4 of hybrid 53, which have the same phase relationships as branches 3 and 4 of hybrid 52, are coupled to branches 3 and 4, respectively, of hybrid 52 by means of identical transformers 56. Branch 1 of hybrid 53 is terminated with a load impedance 57 whose value is selected to inhibit the growth of subharmonic current in stage 50. Branch 2, on the other hand, is terminated by means of an impedance whose value is such as to stimulate subharmonic current. (See page 444 of Penfield and Rafuse, cited above, for a more detailed discussion of the values of these impedances.)

Thus, if the currents $I_A$ and $I_B$ are improperly phased, they will combine in impedance 57. This will load stage 50 unfavorably, thereby tending to suppress this mode of operation in favor of the desired phase relationships which will combine the currents in impedance 58. This, in turn, will load stage 50 favorably. Accordingly, the presence of the second hybrid 53 insures that the signals applied to hybrid 52 will have the proper phase for isolator action regardless of how the signal originated in the output circuit.

Figure 6:
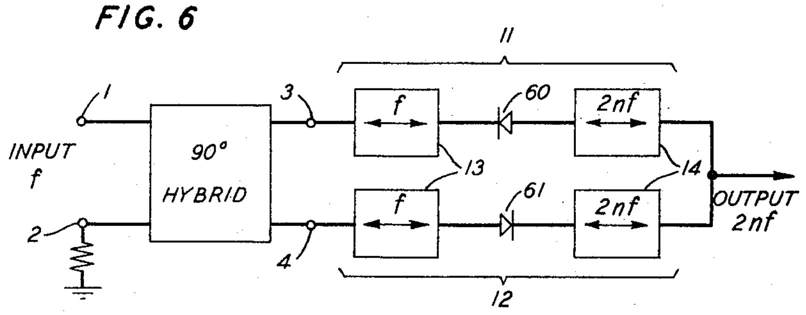
FIG. 6 is a modification of the arrangement of FIG. 1 wherein the diodes, used as nonlinear elements, are oppositely poled to avoid the need for phase shifting before combining the outputs of the diodes.

In each of the illustrative embodiments described hereinabove, means were provided for introducing a 180 degree phase shift in order to combine the harmonic currents in phase in the output circuit. In general such means are necessary when $n$ is odd. In some special configurations, using diodes as the nonlinear elements, the necessary phase shift can be obtained by the manner in which the diodes are connected. For example, in the illustrative embodiments depicted, both diodes are shown poled in the same direction. However, in-phase harmonic current can be obtained with $n$ odd, by poling the diodes in opposite directions. This is illustrated in FIG. 6, wherein diodes 60 and 61 are oppositely poled and the output from the two networks 11 and 12 are connected directly together. Thus, it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A frequency multiplier comprising:
a 90 degree hybrid junction having two pairs of conjugate branches;
means for connecting a signal source of frequency $f$ to one branch of one pair of branches;
a terminating resistor connected to the other branch of said one pair of branches;
a pair of substantially identical two-port networks containing nonlinear elements;
one port of each of said networks being connected respectively to the branches of the other pair of conjugate branches;
and means for coupling the other ports of said networks to an output circuit for extracting the $2n^{th}$ harmonic signals from said networks in phase, where $n$ is an integer.

2. In combination;
a 90 degree hybrid junction having two pairs of conjugate branches;
means for connecting an input circuit to one branch of one pair of branches;
a terminating resistor connected to the other branch of said one pair of branches;
a pair of substantially identical two-port networks containing nonlinear elements;
one port of each of said networks being connected respectively to the branches of the other pair of conjugate branches;

means for coupling the other ports of said networks to a circuit for extracting the $2n^{th}$ harmonic signals in said networks in phase, where $n$ is an integer;

and means for coupling said $2n^{th}$ harmonic signal to a second network containing a nonlinear element for multiplying said $2n^{th}$ harmonic by a factor $$2m+1/2$$

where $m$ is an integer.

3. The combination according to claim 2 wherein $(2n)(2m+1/2)=1$.

4. The combination according to claim 3 including means for controlling the phase of the wave energy propagating in a direction from said two-port networks to said hybrid junction.

5. The combination according to claim 4 wherein said phase controlling means comprises a second 90 degree hybrid junction coupled to said other pair of conjugate branches.

6. The frequency multiplier in accordance with claim 1 wherein said 90 degree hybrid junction comprises:

a transformer, an inductor and a capacitor;

said transformer having a primary winding of N turns and a center-tapped secondary winding of $2N/\sqrt{2}$ turns;

one end of said inductor being connected to one terminal of said secondary winding;

the other end of said inductor and the other end of said secondary winding constituting one of said pairs of conjugate branches;

and said capacitor being connected to the center of said inductor and one terminal of said primary winding;

said secondary winding center-tap and the other terminal of said primary winding constituting said other pair of conjugate branches.

7. A frequency multiplier according to claim 6 wherein the inductance L of said inductor and the capacitance C of said capacitor are related by $L=2/(2\pi f)^2C$ where $f$ is the frequency of the applied wave energy;

and wherein a resistor of resistance $R=(2\pi f)L/4$ is connected between the center-tap of said secondary winding and said one terminal of said primary winding.

References Cited

UNITED STATES PATENTS

| | | | |
|---|---|---|---|
| 2,440,465 | 4/1948 | Ferguson | 321—65 X |
| 3,144,615 | 8/1964 | Engelbrecht | 330—4.6 |
| 3,184,691 | 5/1965 | Marcatili et al. | 333—11 |
| 3,255,400 | 6/1966 | Morgan | 321—69 |
| 3,271,656 | 9/1966 | Hines et al. | 321—69 |

JOHN F. COUCH, *Primary Examiner.*

G. GOLDBERG, *Assistant Examiner.*